Figure 1:
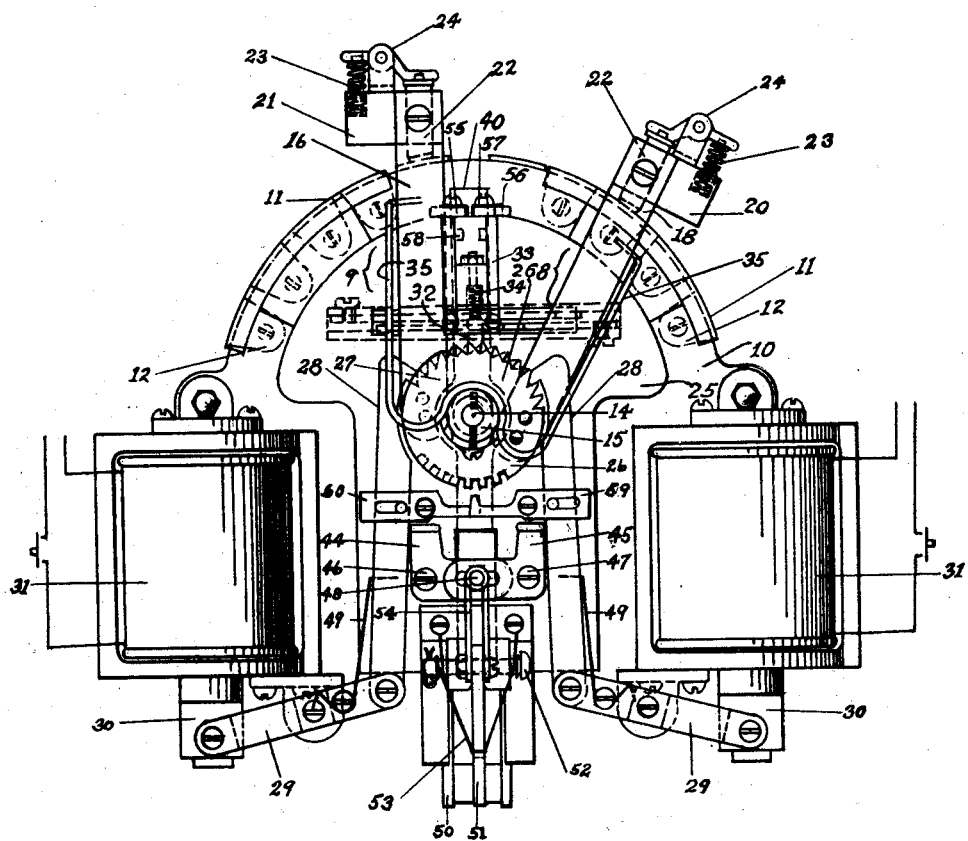
Figure 2:
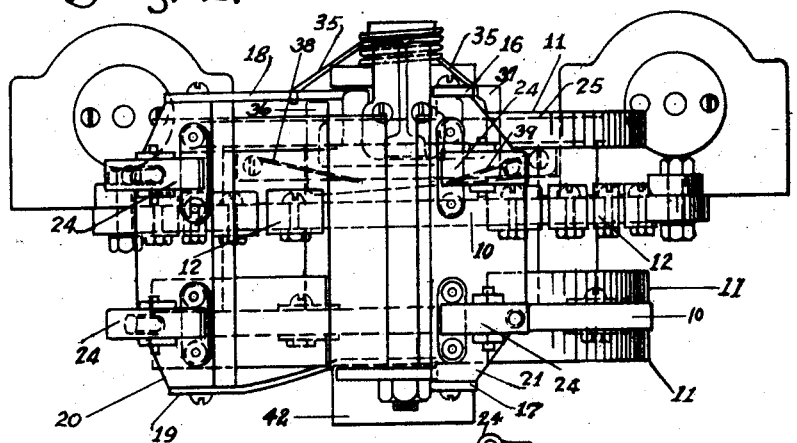
Figure 3:
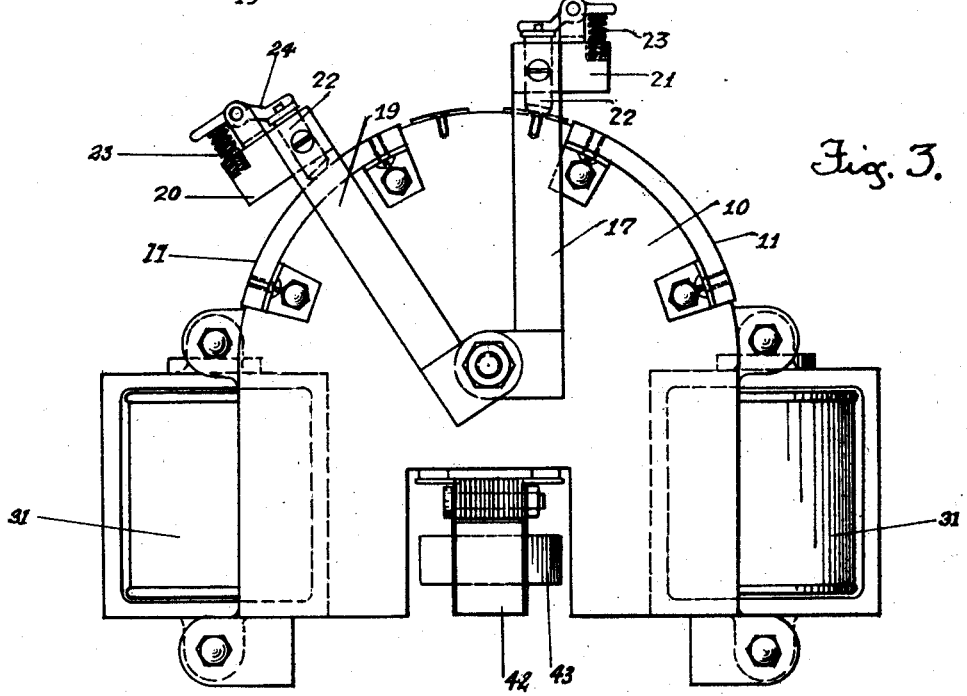

Oct. 20, 1931.  F. H. HOWARD  1,828,113
MOTOR CONTROL
Filed Oct. 12, 1928  4 Sheets-Sheet 1

Inventor
Frank H. Howard
By
Attorney

Oct. 20, 1931.  F. H. HOWARD  1,828,113
MOTOR CONTROL
Filed Oct. 12, 1928    4 Sheets-Sheet 2

Inventor
Frank H. Howard
By
Attorney

Oct. 20, 1931.  F. H. HOWARD  1,828,113
MOTOR CONTROL
Filed Oct. 12, 1928  4 Sheets-Sheet 3
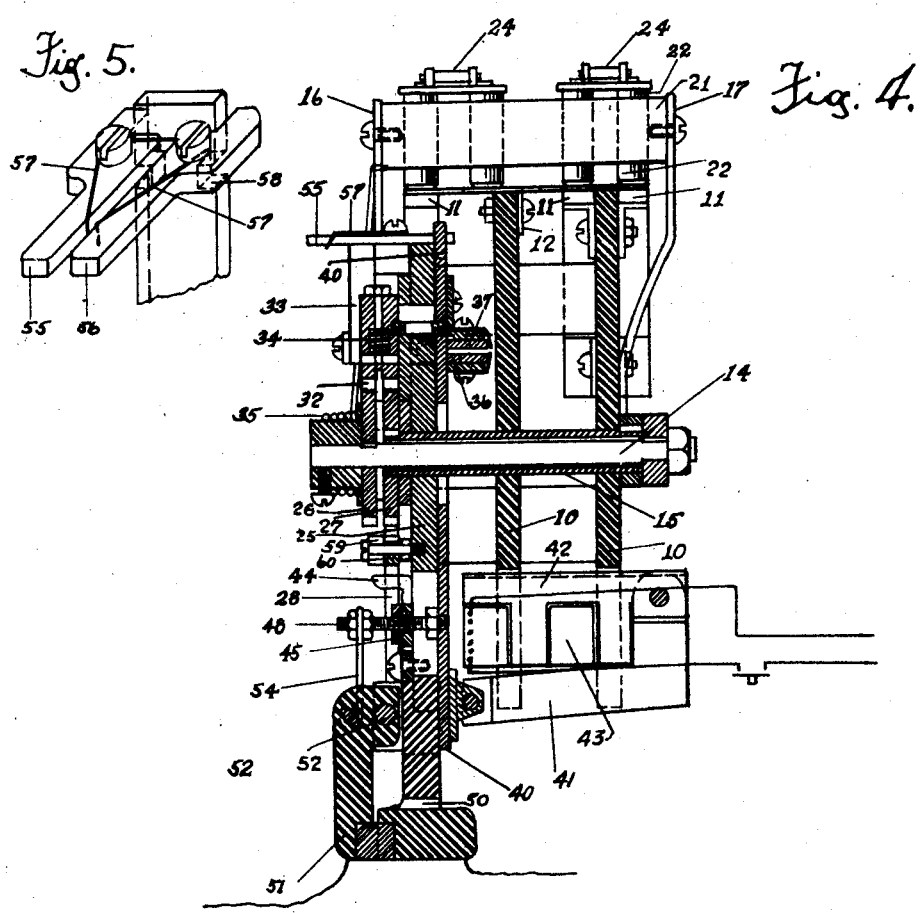
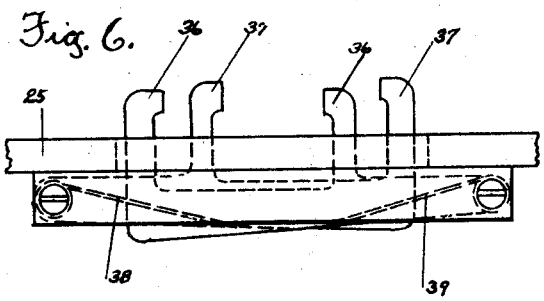
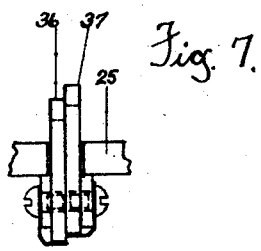
Inventor
Frank H. Howard
By 
Attorney

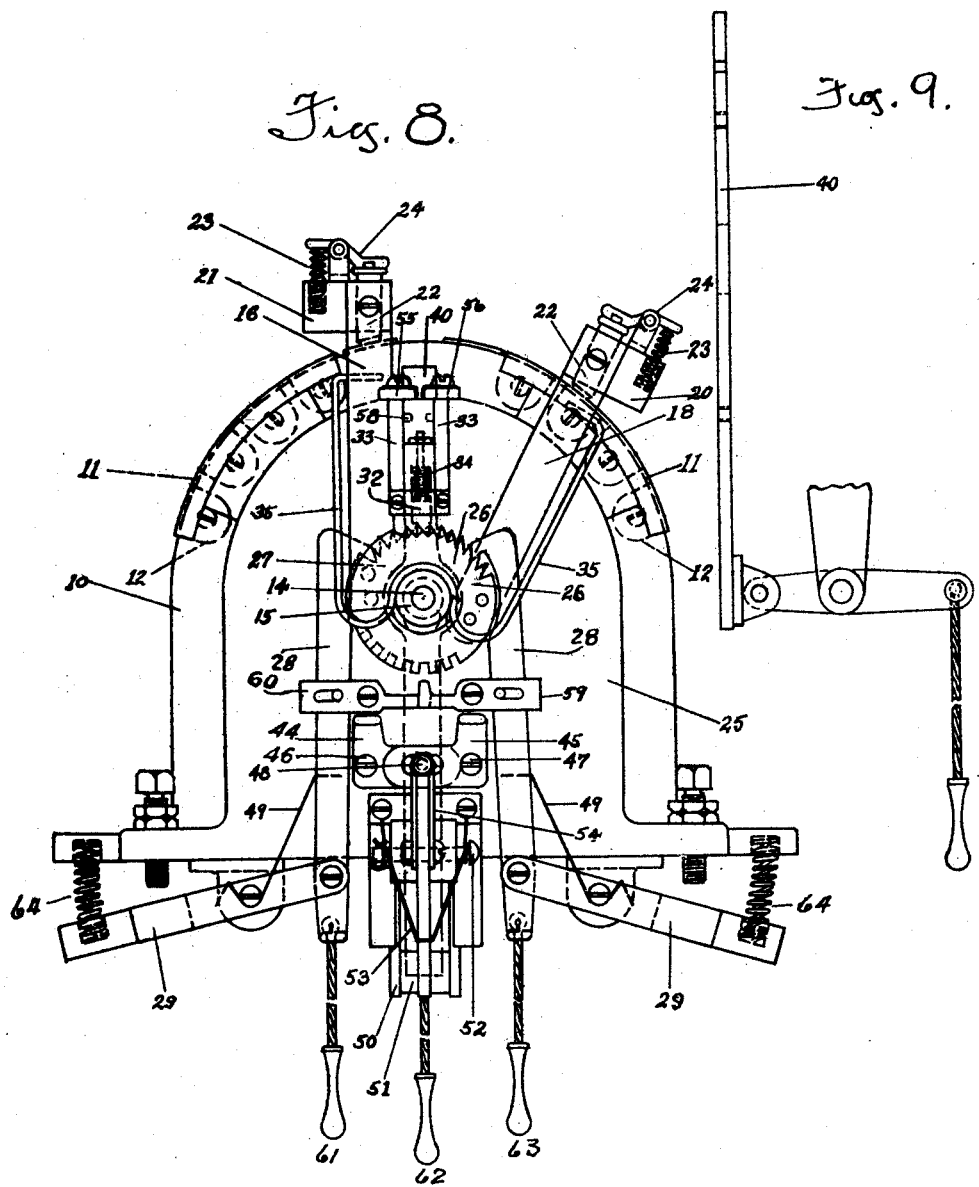

Patented Oct. 20, 1931

1,828,113

UNITED STATES PATENT OFFICE

FRANK H. HOWARD, OF READING, PENNSYLVANIA, ASSIGNOR TO THE PUSH BUTTON ELECTRIC CONTROL CORPORATION, OF READING, PENNSYLVANIA, A CORPORATION OF PENNSYLVANIA

MOTOR CONTROL

Application filed October 12, 1928. Serial No. 312,002.

My invention relates to motor controllers and has particular relation to controllers adapted to be operated from a remote station. In certain types of apparatus wherein an electric motor and controller are employed, as in the case of an electric hoist movable on an overhead runway, it is desirable to mount the controller in a position inaccessible to the operator and to provide means within convenient reach of the operator, at a distance from the controller, for regulating the operation of the controller. Such means are herein referred to as "remote controls," the term being intended to designate controls which may be in close proximity to the controller but which are not actually a part thereof.

The primary object of my invention is to provide remote controls of this sort for regulating directional and speed changes in an electric motor and to enable the operator by a simple movement of the hand, or by successive movements of the same nature, to start, stop, reverse or vary the speed of the motor.

A further object of my invention is to provide means for preventing rapid acceleration of the motor, as well as a number of other safety devices to insure the regular operation of the controller. Manifestly, where a controller is designed for use in conjunction with an electric hoist or similar apparatus, it is particularly important to guard against too rapid acceleration of the motor, and against many kinds of failures of the controlling apparatus which might seriously injure the motor of the apparatus driven by it.

Still another object of my invention is to dispense with the cumbersome and expensive equipment heretofore used with controllers operated at a distance by means of electric relays or contractors, and to substitute therefore a device which, though simple and inexpensive, enables the operator to regulate at a distance the motor speed or direction with the same precision and flexibility as is now obtainable with a drum or panel type controller by manipulation of devices forming a part of the controller itself.

The various novel features of my invention are hereinafter described in connection with an embodiment of the invention illustrated in the accompanying drawings, whereof:

Fig. I is a front elevation of the controller;
Fig. II is a plan view of the same;
Fig. III is a rear elevation of the same;
Fig. IV is a central vertical section of the same taken along the lines IV—IV of Fig. I;
Fig. V is a detailed perspective view of the trip-rod safety levers hereinafter described;
Figs. VI and VII are detailed front and side views respectively of the locking dogs hereinafter described;
Fig. VIII is a front elevation of a modified form of controller operated by purely mechanical means; and,
Fig. IX is a detailed view of the stop control shown in Fig. VIII.

With particular reference to Fig. I the various appliances comprising the controller are shown mounted upon the mounting plate 25 and the stationary elements 10 which consist of flat plates of a hard insulating composition. These plates 10 are assembled with their flat surfaces in parallel planes and at a sufficient distance from each other to provide the necessary air gap between contacts of different potential. Mounted upon the upper edges of the plates 10, which edges are conveniently of semi-circular contour, are two sets of contact rings 11 and contact segments 12 comprising blocks of conducting material and presenting a cylindrical surface. Co-operating with the contacts 11 and 12 to change resistance in the field or armature circuits of the motor in a manner common to controllers of the drum-type, are two U-shaped contact fingers comprehensively designated by the numerals 8 and 9 and conveniently referred to as the ahead and reverse fingers respectively. The finger 8 is mounted on the solid cylindrical shaft 14 which is located centrally of the plates 10 and is adapted to turn with the shaft 14 to describe an arc coincident with the edges of the plates 10, its movement controlling ahead motion of the motor, each successive engagement with a contact segment 12 causing a predetermined change in the resistance of the motor circuit and hence a change in speed. The finger 8 comprises a pair of arms 18 and 19 with their outward ends connected by a block 20 carrying brushes 22 adapted to engage the stationary contacts 11 and 12, such engagement being insured by the springs 23 and levers 24 which serve to press the brushes against the surface of the stationary contacts 11 and 12.

In like manner the finger 9, which controls reverse motion of the motor and which is mounted on a hollow cylindrical shaft 15, comprises a pair of arms 16 and 17 carrying a block 20 with spring urged brushes 22. The blocks 20 are preferably constructed of hard insulating material, each block carrying a pair of brushes 22, one brush being adapted to straddle the front mounting plate 25 and the plate 10 upon which the contact segments 12 are mounted, and the other brush adapted to make and break contact between the contact rings 11 on the rear plate 10. It will be apparent that the first mentioned brush makes contact to control step-by-step speed changes in the motor, whereas the second brush makes and breaks contact to control starting and stopping. For example, when both fingers 8 and 9 are in the vertical position, the motor circuit is not energized, and as each finger is swung about its axis to the various radial positions, successive engagement with the contact segments 12 changes the motor connections by reducing the resistance in the armature circuit, and thus augmenting the motor speed by predetermined increments. Directional control is obtained through the selection of the finger 8 or 9 to be operated.

Attached to the pivot ends of the fingers 8 and 9 at the front of the controller are the ratchets 26 and 27, the ratchet 26 being adapted to be operated in a clockwise direction to progress the finger 8 towards the position of maximum speed, and the ratchet 27 being adapted to be operated in a counter-clockwise direction to cause similar movement of the finger 9. The teeth of the ratchets 26 and 27 are so designed as to pitch and form that the displacement of one tooth causes a movement of the finger contacts 22 corresponding to the distance between centers of adjacent segments 12.

The fingers 8 and 9 are swung to their various radial positions by reciprocatory movement of the pawls 28, the ends of which are designed to engage the ratchet teeth. Each downward movement of a pawl 28 causes the corresponding ratchet to rotate to the extent of the displacement of one tooth. Actuation of the pawls 28 is accomplished by energizing the solenoids 31 to draw the plungers 30 upward and thus through the medium of the levers 29 cause the desired movement of the pawls 28. Deenergizing a solenoid 31 causes its plunger 30 to drop by gravity to return a pawl 28 to normal position for engagement with the next succeeding tooth of the ratchet. In circuit with the coils of the solenoids 31 I preferably employ switches, conveniently in the form of push buttons, located within reach of the controller operator, one push button controlling the solenoid which is associated with the ahead finger 8 and the other controlling the solenoid associated with the reverse finger 9.

It will be apparent from the description thus far that successive closing and opening of the switches or push buttons at the control station will serve to advance the fingers 8 and 9 to succeeding contact positions by virtue of the intermittent angular movement of the ratchets.

On the front mounting plate 25, I provide within suitable guides 33 a locking pawl 32 which is urged by a spring 34 against teeth of the ratchets 26 and 27 and serves to lock the ratchets when thus engaged. This locking pawl 32 is thrown in and out of engagement by means of a trip rod 40 positioned behind the mounting plate 25 and movable in a vertical plane with respect to the plate 25 and guided by it. A tie 7 passes through a slot in the plate 25 joining the trip rod 40 with the locking pawl 32 and communicating reciprocatory movement of the former to the latter. The bottom end of the trip rod 40 is pivoted to a hinged keeper 41 which in turn is associated with a magnet 42 energized by a coil 43. The coil 43 is in circuit with a third switch or push button located at the control station. Actuation of this switch, conveniently referred to as the stop switch, energizes the coil 43 and through the medium of the keeper 41 and trip rod 40, releases the locking pawl 32 from engagement with the ratchet teeth.

Upward movement of the trip rod 40 also actuates the bell crank levers 44 and 45 which are pivoted on the mounting plate 25 at 46 and 47, respectively. A stud-bolt 48 projecting through a slot in plate 25 connects the trip rod 40 with these bell crank levers 44 and 45, and as the levers are operated they press outwardly against the pawls 28 to disengage them from the ratchets 26 and 27, and thus permit the return of the fingers 8 and 9 to off position.

A torsional spring 35 is secured to the forward end of the shaft 14 with its ends attached to the fingers 8 and 9, and serves to automatically return the fingers to the off or vertical position whenever the ratchets 26 and 27 are free to turn.

The locking pawl 32 engages the teeth of the ratchets 26 and 27 in such manner that they are free to turn in one direction only. For example, the action of the pawls 28 to turn the ratchets is not interrupted by their engagement with the locking pawl 32, but the fingers 8 and 9 can only be returned to the vertical position by disengagement of the locking pawl. It will be apparent, therefore, that the closing of the stop switch will cause either finger 8 or 9 to return automatically from any position of contact with the segments 12 to the off or vertical position.

As a safety device I provide locking dogs 36 and 37 shown in detail in Figs. VI and VII which are pivoted to the back of the mounting plate 25 and project through slots in the plate to engage the arms 16 and 18 of the fingers 9 and 8. These dogs 36 and 37 are provided with torsional springs 38 and 39 which tend to force them outward through the mounting plate 25 and into the path of the arms 16 and 18 to obstruct their movement. As shown in Fig. II, when the arm 16 is in vertical position and the arm 18 is at an angle from the vertical, the arm 16 is locked by the dog 37. Upon the return of the arm 18 to vertical position the dog 37 is pressed inward against the action of the spring 38 towards the mounting plate 25 by the arm 18, and the arm 16 is again free to move. Accordingly, it is impossible to operate both the ahead finger 8 and the reverse finger 9 at the same time and it is impossible to operate either finger when the other is not in vertical position.

As an additional safety device to instantly disconnect the motor from the supply lines a stationary contact 50 is provided at the bottom of the mounting plate 25 and, a movable contact 51 is hinged at 52 and operated by the trip rod 40 through the medium of the stud-bolt 48, a link 54 and a spring 53 to engage or disengage the stationary contact 50. When the trip rod 40 is raised, the contacts 50 and 51 are separated and the line to the motor broken. After the line to the motor has been broken by closing the stop switch with consequent rising of the trip rod 40 and the fingers 8 and 9 have returned to off position, to re-establish the circuit, the stop switch must be opened to release the keeper 41, drop the trip rod 40 and establish contact between the contacts 50 and 51. The controller is then in position to start the motor again.

If the fingers 8 or 9 should for any reason fail to return to the vertical position upon the closing of the stop switch, as might happen in case the spring 35 should break or fusion at a contact should occur, the motor circuit will be disconnected by the closing of the stop switch and the resulting upward movement of the rip rod 40, but the circuit cannot be re-established until the arms 16 and 18 are both in vertical position.

This feature is accomplished by the provision of safety levers 55 and 56, shown in detail in Fig. V, which are pivoted to the mounting plate 25 and provided with springs 57 to engage a notch in the upper end of the trip rod 40. If the levers 55 are not thrown open to release the trip rod 40 by the return movement of the fingers 8 and 9, the motor circuit cannot be re-established through contacts 50 and 51.

To limit angular movement of the fingers 8 and 9 so as to engage the segments 12 in proper order, additional safety pawls 59 and 60 are provided. These pawls link with pins on the pawls 28 and are pivoted to the mounting plate 25. As each pawl 28 is drawn downward, the end of the safety pawl 59 or 60 associated with it is swung to engage a tooth on the ratchet so that there can be no further movement of the ratchet until the pawl 28 is again actuated. Each ratchet is provided with two sets of teeth of different shape so that the pawls may operate in the manner described.

The operation of the controller will be apparent from the above description. To operate the solenoids 31 and the trip magnet 42, I preferably employ three push button switches normally retained in off position by springs. These push buttons may be labeled for convenience "stop", "ahead" and "reverse", and they are preferably located in a box within easy reach of the operator's hand. This arrangement enables the operator of the controller to perform other operations at the same time, such as the moving of a hoist on which the controller is mounted. Pressure applied to either of the directional control buttons will instantly connect the motor for operation at minimum speed, and to increase this speed it is necessary for the operator to release the button and press it again. Successive actuation of the button causes step-by-step progression of a finger 8 or 9, according to the direction desired, along the contact segments 12 and gradually increases the speed of the motor to the desired acceleration. It is impossible for the operator to increase the motor speed at a too rapid rate on account of the distinct successive movements of the hand necessary to obtain maximum speed. To stop the motor pressure is applied to the "stop" button which disconnects the motor circuit regardless of the position of the fingers 8 or 9.

In some installations it is convenient to provide mechanical hand controls depending from the controller as illustrated in the modified form of my invention shown in Fig. VIII. With this arrangement, the solenoids 31 are eliminated and flexible cables 61, 62, 63 are provided to operate the pawls 28 and the trip magnet 42 in a manner apparent from the drawings. The cables 61 and 63 are operated against the pressure of springs 64 so that by pulling downward and then releasing a cable handle the same effect is obtained as by pressing and releasing one of the push button controls aforementioned.

By virtue of the various safety devices herein described and the novel operation of the remote controls it is possible to effect at the control station the desired regulation of the motor with the same flexibility of operation which is obtained in operating controllers now in common use by the manipulation of mechanical devices forming a part of the controller itself.

While I have described my invention in some detail as applied to the specific embodiment thereof shown in the drawings, I wish it to be understood that changes may be made in the form disclosed, as will be apparent to those skilled in the art, without departing from the spirit of the invention as defined in the claims hereto appended, and that certain features of the apparatus disclosed may at times be used to advantage without a corresponding use of other features.

Having thus described my invention, I claim:

1. An electric controller comprising two sets of contact rings and segments, a pair of contact fingers adapted to engage said rings and segments, electro-magnetic means for selectively effecting step-by-step relative movement between either finger and a set of contact rings and segments, an additional electro-magnet, and means for returning either finger to its initial relative position with respect to said rings and segments upon the energization of said last mentioned electro-magnet.

2. An electric controller comprising two sets of stationary contact rings and segments presenting a cylindric surface, a pair of rotatable contact fingers having a common axis centrally of said rings and segments, electromagnetic means for selectively effecting step-by-step progression of either finger with respect to a set of rings and segments an additional electro-magnet, and means for returning either finger to its initial position upon the energization of said last mentioned electro-magnet.

3. An electric controller comprising two sets of contact rings and segments, a pair of contact fingers adapted to engage said rings and segments, electro-magnetic means including a pair of ratchets and pawls for effecting step-by-step relative movement between either finger and a set of rings and segments, a locking pawl adapted normally to engage both ratchets, an additional electro-magnet, and means for disengaging said locking pawl and returning either finger to its initial relative position with respect to said rings and segments upon the energization of said last mentioned electro-magnet.

4. An electric controller comprising stationary contact rings and segments presenting a cylindric surface, a rotatable contact finger pivoted centrally of said rings and segments, and adapted to engage said segments in succession, an electro-magnet, and means for effecting step-by-step progression of said finger with respect to said segments upon successive energization of the electro-magnet.

5. An electric controller comprising stationary contact rings and segments presenting a cylindric surface, U-shaped finger pivoted centrally of said rings and segments, said finger carrying brushes bridging said rings and segments, and electro-magnetic means for effecting step-by-step progression of said finger to make and break contact between said rings and to engage said segments in succession.

6. An electric controller comprising two sets of stationary contact rings and segments, a pair of contact fingers, each finger being adapted to engage a set of rings and segments, means including an electro-magnet for selectively effecting step-by-step progression of either finger with respect to said segments, and means for locking one finger when the other finger has moved from its normal position of rest.

7. An electric controller comprising two sets of stationary contact segments presenting a semi-cylindrical surface, a pair of contact fingers, each finger being adapted to engage a set of segments and each finger being pivoted centrally of said segments, electromagnetic means for selectively effecting step-by-step progression of either finger with respect to a set of segments, and means for locking one finger when the other finger has moved from its normal position of rest.

8. An electric controller comprising a frame, two sets of stationary contacts of arcuate form on said frame, a pair of contact fingers, each finger being rotatable to engage a set of contacts, means for effecting a step-by-step progression of either finger with respect to said stationary contacts, and a dog pivoted on said frame, said dog being adapted to lock one of said fingers when the other has moved from its normal position of rest.

9. An electric controller comprising a frame, two sets of contact rings and segments mounted on said frame and presenting a cylindrical surface, a pair of contact fingers, each finger being rotatable to make and break contact with a set of rings and to engage a set of segments in succession, and electromagnetic means for selectively effecting step-by-step progression of either finger, and means including an additional electro-magnet for returning either finger to its normal position of rest.

10. An electric controller comprising a frame, two sets of stationary contacts on said frame, a pair of contact fingers, each finger being rotatable to engage a set of contacts, electro-magnetic means including a pair of pawls and ratchets for effecting step-by-step progression of either finger with respect to said contacts, a trip rod slidable on said frame and having a locking pawl adapted to engage both ratchets to hold them against reverse rotation, and an additional electro-magnet for operating said trip rod.

11. An electric controller comprising a frame, stationary contact segments and make and break contacts on said frame, a rotatable contact finger adapted to engage said stationary contacts in succession, means for effecting step-by-step progression of said finger with respect to said segments, supplemental make and break contacts, and electro-magnetic means for returning said contact finger to its initial position while concurrently opening said supplemental contacts.

12. An electric controller comprising a frame, stationary contact segments and rings on said frame, a rotatable contact finger adapted to make and break contact between said rings and to engage said contact segments in succession, means for effecting step-by-step progression of said finger with respect to said segments, supplemental make and break contacts, and electro-magnetic means for returning said contact finger to its initial position while concurrently opening said supplemental contacts.

13. An electric controller comprising a frame, stationary contact segments and rings on said frame, a rotatable contact finger adapted to make and break contact between said rings and to engage said segments in succession, said finger being held in normal position by a spring, means for effecting step-by-step progression of said finger with respect to said segments, a trip-rod for releasing said finger to allow its return under spring pressure to normal position, a supplemental make and break contact operated by said trip-rod, an electro-magnet for operating said trip-rod, and means for preventing said trip rod from returning to normal position in case the contact finger fails to return to its normal position, whereby said supplemental make and break contact will remain open.

14. An electric controller comprising stationary contact rings and segments presenting a cylindric surface, a pair of arms pivoted centrally of said rings and segments, a connecting member joining the ends of said arms and carrying brushes bridging said rings and segments, and electro-magnetic means for effecting step-by-step progression of said arms to make and break contact between said rings and to engage said segments in succession.

15. An electric controller comprising a number of flat plates of insulating composition and of substantially semi-circular contour, said plates having their flat surfaces in parallel planes and in spaced relation, a series of contact segments and contact rings mounted on the edges of said plates, a rotatable contact finger pivoted centrally of said plates, brushes carried by said contact finger adapted to engage said segments in succession, and electro-magnetic means for effecting step-by-step progression of said finger to make and break contact between said rings and to engage said segments in succession.

In testimony whereof I affix my signature.

FRANK H. HOWARD.